(12) United States Patent
Tian

(10) Patent No.: US 11,894,917 B2
(45) Date of Patent: Feb. 6, 2024

(54) METHOD AND APPARATUS FOR TIME SYNCHRONIZATION BETWEEN HEAD-MOUNTED DEVICE AND PERIPHERAL DEVICE

(71) Applicant: Qingdao Pico Technology Co., Ltd., Qingdao (CN)

(72) Inventor: Ye Tian, Beijing (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 18/094,108

(22) Filed: Jan. 6, 2023

(65) Prior Publication Data

US 2023/0261777 A1 Aug. 17, 2023

Related U.S. Application Data

(63) Continuation of application No. PCT/CN2022/109027, filed on Jul. 29, 2022.

(30) Foreign Application Priority Data

Aug. 10, 2021 (CN) .......................... 202110913774.3

(51) Int. Cl.
H04J 3/06 (2006.01)
H04L 7/00 (2006.01)

(52) U.S. Cl.
CPC .......... *H04J 3/0661* (2013.01); *H04L 7/0012* (2013.01)

(58) Field of Classification Search
CPC ....... H04J 3/0661; H04L 7/0012; G09G 5/12; G09G 2340/12; G09G 2370/16;
(Continued)

(56) References Cited

U.S. PATENT DOCUMENTS

2012/0263220 A1 10/2012 Li et al.
2018/0006798 A1 1/2018 Bilstad et al.
(Continued)

FOREIGN PATENT DOCUMENTS

CN 102833062 A 12/2012
CN 207612270 U 7/2018
(Continued)

OTHER PUBLICATIONS

First Office Action issued in Chinese Application No. 202110913774.3 dated Jun. 13, 2022.
(Continued)

*Primary Examiner* — Omer S Mian
(74) *Attorney, Agent, or Firm* — ARENTFOX SCHIFF LLP

(57) ABSTRACT

Provided are a method for time synchronization between a head-mounted device and a peripheral device. The method includes: obtaining sample data of an inertial measurement unit of the peripheral device, and determining a first timestamp representing a time at which the sample data is sampled; transmitting an interrupt request and the sample data to the head-mounted device, and determining a second timestamp representing a time at which the interrupt request is transmitted; determining a third timestamp representing a time at which the interrupt request is received by the head-mounted device; and determining a time difference based on the third timestamp and the second timestamp, and performing time compensation for the first timestamp based on the time difference to enable the peripheral device and the head-mounted device to complete the time synchronization with a unified time standard.

9 Claims, 2 Drawing Sheets

(58) Field of Classification Search
CPC ............ G09G 3/003; G02B 2027/0138; G02B 2027/014; H04W 56/0065; H04W 56/0015; H04W 56/0055; G06F 1/14; G06F 1/12; G06F 3/011; G06F 3/017
See application file for complete search history.

(56) References Cited

U.S. PATENT DOCUMENTS

| | | | |
|---|---|---|---|
| 2018/0111021 A1* | 4/2018 | Matsumoto | A63B 24/0006 |
| 2018/0227869 A1 | 8/2018 | Lin | |
| 2019/0110264 A1* | 4/2019 | Chung | H04W 56/002 |
| 2021/0104211 A1* | 4/2021 | John | G06F 3/017 |
| 2022/0174452 A1* | 6/2022 | Bark | H04W 12/02 |
| 2023/0195242 A1* | 6/2023 | Colafrancesco | G06F 3/033 |
| | | | 345/156 |

FOREIGN PATENT DOCUMENTS

| | | |
|---|---|---|
| CN | 109074149 A | 12/2018 |
| CN | 110568753 A | 12/2019 |
| CN | 110636603 A | 12/2019 |
| CN | 111162859 A | 5/2020 |
| CN | 112154614 A | 12/2020 |
| CN | 112506272 A | 3/2021 |
| CN | 112751639 A | 5/2021 |
| CN | 112822480 A | 5/2021 |
| CN | 113687590 A | 11/2021 |
| WO | 2018077176 A1 | 5/2018 |

OTHER PUBLICATIONS

International Search Report issued in International Patent Application No. PCT/CN2022/109027 dated Sep. 21, 2022.
Notice of Decision of Granting Patent Right for Invention and Supplemental Search in CN202110913774.3, dated Jan. 4, 2023, 3 pages.

* cited by examiner

METHOD AND APPARATUS FOR TIME SYNCHRONIZATION BETWEEN HEAD-MOUNTED DEVICE AND PERIPHERAL DEVICE

CROSS REFERENCE TO RELATED APPLICATIONS

This application is a continuation of International Application No. PCT/CN2022/109027, filed on Jul. 29, 2022, which claims priority to Chinese Patent Application No. 202110913774.3, filed on Aug. 10, 2021, entitled "METHOD FOR TIME SYNCHRONIZATION BETWEEN HEAD-MOUNTED DEVICE AND HANDLE IN VR SYSTEM". The disclosures of the aforementioned applications are hereby incorporated by reference in their entireties

FIELD

The present disclosure relates to the technical field of virtual reality (VR), and particularly, relates to a method and apparatus for time synchronization between a head-mounted device and a peripheral device.

BACKGROUND

With the advance in science and technology as well as the diversified development of market requirements, a virtual reality system has been increasingly popularized and applied to various fields such as computer games, health and safety, industry and educational training. As a few examples, a mixed virtual reality system is being integrated to various devices in people's daily life, such as a mobile communication device, a game device, a personal computer, a cinema, a theme park, a laboratory in a college/university, a classroom for students, and a fitness room of a hospital.

For a VR device, if it is desired that a scene in a display of the VR device changes along with the movement of the head of a person in real time, a direction, to which the head faces, has to be known. For example, when a person wearing the VR device looks upwards, the display is required to display the sky in a virtual world to the person's eyes in real time; and when the person turns around, the display is required to display the scene behind the person, thereby simulating real turnaround. An Inertial Measurement Unit (IMU) is required to obtain posture information, thereby enabling the VR device to detect the action of "looking upwards".

With the continuous development of VR, the diversified interaction becomes an inelastic demand, and accordingly, a VR handle matching with the VR device emerges. In this way, the posture information of a hand is obtained by an IMU in the handle, the 6 degrees of freedom (6dof) of a head-mounted device matches with the 6dof of the handle, which brings more abundant sensual experience for the VR device.

The posture data of the VR head-mounted device and the handle are calculated by the respective IMUs. However, for VR, the head's 6dof are required to be combined with the hand's 6dof, in order to obtain an integral 6dof posture. It is a very important problem to synchronize the two IMUs. If the actions of the head and the hand are not time-synchronous, these actions may be inconsistent or a delay may occur, and a packet loss of the hand IMU may cause the incoherence, lagging or position loss of data, all of which may lead to poor user experience.

Therefore, there is an urgent need for a method for time synchronization between a head-mounted device and a handle in a VR system, which is capable of unifying a time standard, avoiding time delay, reducing lagging and improving the user experience.

SUMMARY

In view of the above-mentioned problems, the objectives of the present disclosure are to provide a method and apparatus for time synchronization between a head-mounted device and a peripheral device, to solve the problem that, in an existing VR system, the head's 6dof are required to be combined with the hand's 6dof to obtain an integral 6dof posture, if two IMUs are not synchronous in time, inconsistence of actions of the head and the hand or great delay may occur, and the packet loss of the hand IMU may cause the incoherence, lagging or position loss of data, which leads to poor user experience.

The present disclosure provides a method for time synchronization between a head-mounted device and a peripheral device. The method includes: obtaining sample data of an inertial measurement unit of the peripheral device, and determining a first timestamp representing a time at which the sample data is sampled; transmitting an interrupt request and the sample data to the head-mounted device, and determining a second timestamp representing a time at which the interrupt request is transmitted; determining a third timestamp representing a time at which the interrupt request is received by the head-mounted device; and determining a time difference based on the third timestamp and the second timestamp, and performing time compensation for the first timestamp based on the time difference to enable the peripheral device and the head-mounted device to complete the time synchronization with a unified time standard.

The present disclosure further provides an apparatus for time synchronization between a head-mounted device and a peripheral device to implement the above-mentioned method for time synchronization between the head-mounted device and the peripheral device. The apparatus includes: a processing unit configured to obtain sample data of an inertial measurement unit of the peripheral device, and determine a first timestamp representing a time at which the sample data is sampled; a transmission interrupt unit configured to transmit an interrupt request and the sample data to the head-mounted device, and determine a second timestamp representing a time at which the interrupt request is transmitted; a determination unit configured to determine a third timestamp representing a time at which the interrupt request is received by the head-mounted device; and a difference compensation unit configured to determine a time difference based on the third timestamp and the second timestamp, and perform time compensation for the first timestamp based on the time difference to enable the peripheral device and the head-mounted device to complete the time synchronization with a unified time standard.

BRIEF DESCRIPTION OF THE DRAWINGS

Other objectives and results of the present disclosure will become clearer and will be easy understand in conjunction with the following contents of the description in conjunction with the accompanying drawings and the more comprehensive understanding for the present disclosure. In the accompanying drawings.

DETAILED EMBODIMENTS

Figure 1:
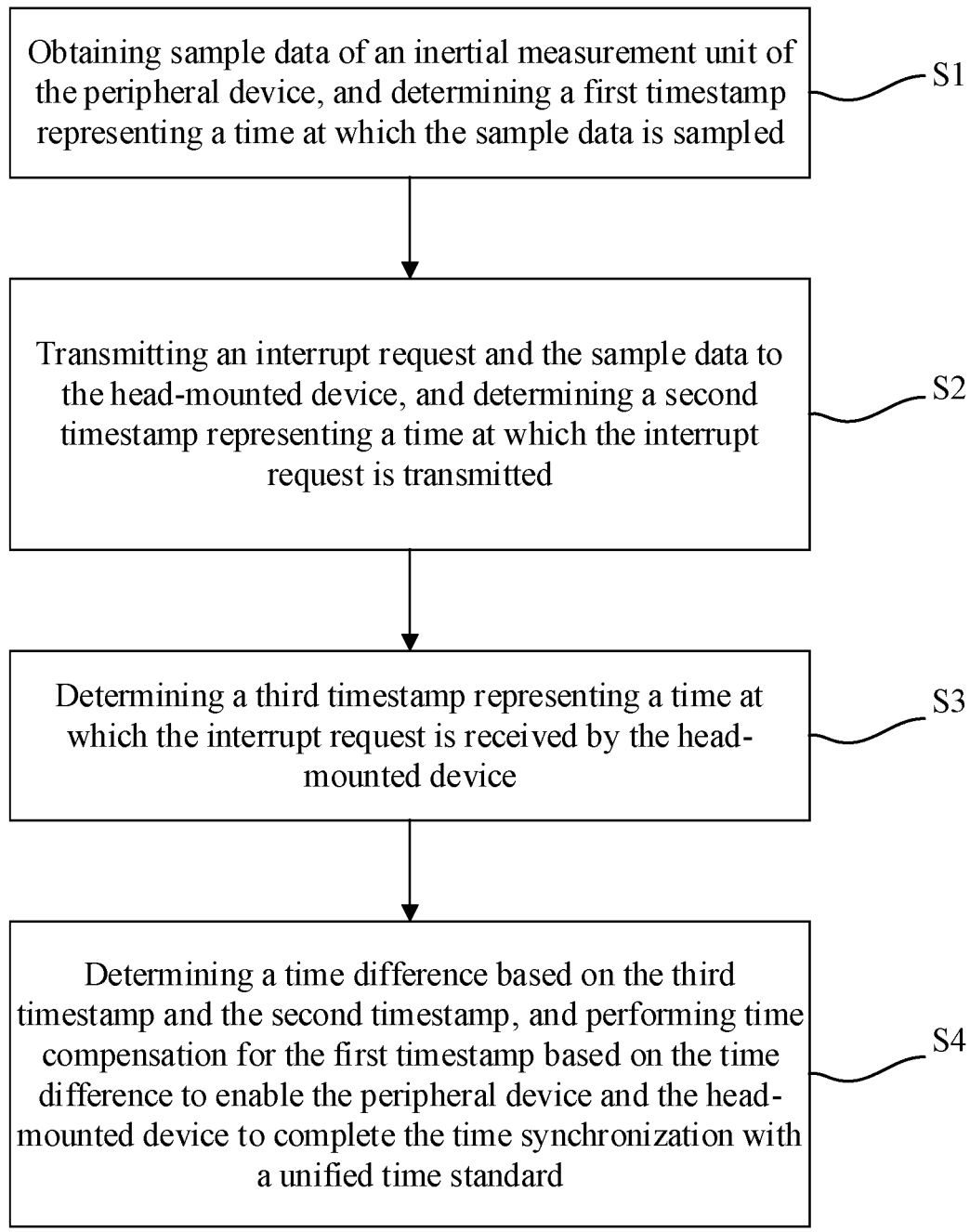
FIG. 1 is a flowchart of a method for time synchronization between a head-mounted device and a peripheral device according to an embodiment of the present disclosure.

In an existing VR system, the head's 6dof are required to combined with the hand's 6dof to obtain an integral 6dof posture. If two IMUs are not synchronous in time, inconsistence of actions of the head and the hand or significant delay may occur, and the packet loss of the hand IMU may cause the incoherence, lagging or position loss of data, thereby resulting in poor user experience.

In view of the above-mentioned problem, the present disclosure provides a method and apparatus for time synchronization between a head-mounted device and a peripheral device.

The present disclosure provides a method for time synchronization between a head-mounted device and a peripheral device. The method includes: obtaining sample data of an inertial measurement unit of the peripheral device, and determining a first timestamp representing a time at which the sample data is sampled; transmitting an interrupt request and the sample data to the head-mounted device, and determining a second timestamp representing a time at which the interrupt request is transmitted; determining a third timestamp representing a time at which the interrupt request is received by the head-mounted device; and determining a time difference based on the third timestamp and the second timestamp, and performing time compensation for the first timestamp based on the time difference to enable the peripheral device and the head-mounted device to complete the time synchronization with a unified time standard.

In an embodiment, a sampling frequency of the inertial measurement unit is 1 KHz.

In an embodiment, the sample data includes angular speed data and gravitational acceleration data of the peripheral device.

In an embodiment, said obtaining the sample data of the inertial measurement unit of the peripheral device, and said determining the first timestamp representing the time at which the sample data is sampled include: obtaining, from the inertial measurement unit via a Bluetooth device, the sample data and sampling time of the sample data as recorded by the inertial measurement unit; and determining, as the first timestamp, a timestamp corresponding to the sampling time of the sample data.

In an embodiment, said determining the third timestamp representing a time at which the interrupt request is received by the head-mounted device includes: obtaining a reading time at which the sample data is read as recorded by the head-mounted device, the reading time being a time at which the sample data is read by the head-mounted device via a communication interface after the head-mounted device receives the interrupt request and obtains the sample data; and determining, as the third timestamp, a timestamp corresponding to the reading time.

In an embodiment, said determining the time difference based on the third timestamp and the second timestamp includes: calculating a first difference between the third timestamp and the second timestamp; and calculating a second difference between the first difference and a transmission consumption time obtained in advance, and determining the second difference as the time difference.

The present disclosure further provides an apparatus for time synchronization between a head-mounted device and a peripheral device to implement the above-mentioned method for time synchronization between the head-mounted device and the peripheral device. The apparatus includes: a processing unit configured to obtain sample data of an inertial measurement unit of the peripheral device, and determine a first timestamp representing a time at which the sample data is sampled; a transmission interrupt unit configured to transmit an interrupt request and the sample data to the head-mounted device, and determine a second timestamp representing a time at which the interrupt request is transmitted; a determination unit configured to determine a third timestamp representing a time at which the interrupt request is received by the head-mounted device; and a difference compensation unit configured to determine a time difference based on the third timestamp and the second timestamp, and perform time compensation for the first timestamp based on the time difference to enable the peripheral device and the head-mounted device to complete the time synchronization with a unified time standard.

In an embodiment, the inertial measurement unit includes a gyroscope and a gravity sensor. The gyroscope is configured to sense angular speed data of the peripheral device. The gravity sensor is configured to sense gravitational acceleration data of the peripheral device.

In an embodiment, the head-mounted device includes: an interrupt receiving unit configured to receive the interrupt request and obtain the sample data; and a data reading unit configured to read the sample data via a communication interface and record a reading time of the sample data according to a time standard of the head-mounted device.

In an embodiment, the difference compensation unit is configured to: calculate a first difference between the third timestamp and the second timestamp; and calculate a second difference between the first difference and a transmission consumption time obtained in advance, and determine the second difference as the time difference.

Specific embodiments of the present disclosure will be described in detail below in conjunction with the accompanying drawings.

Figure 2:
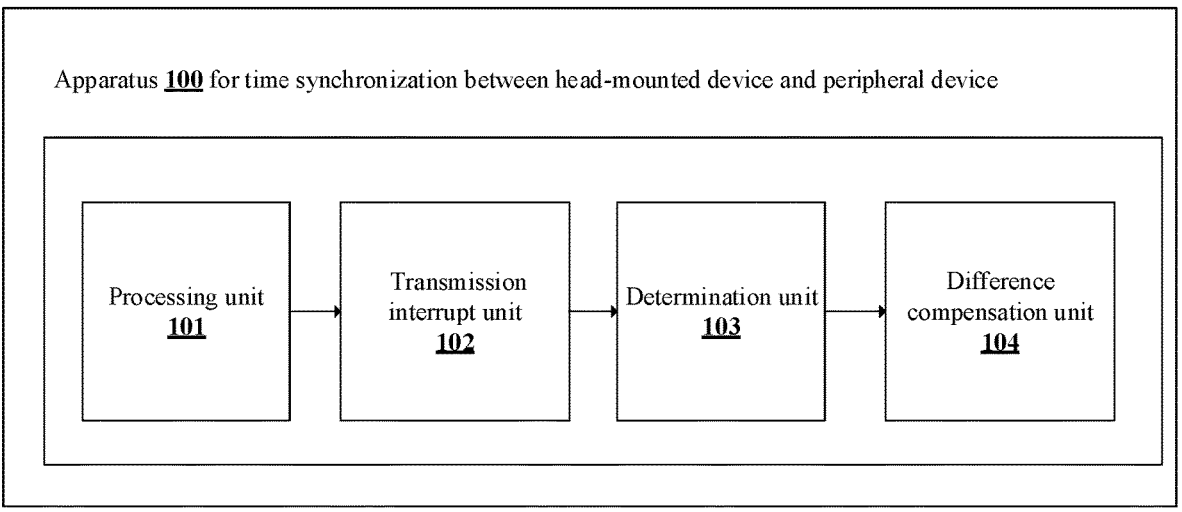
FIG. 2 is a schematic diagram of an apparatus for time synchronization between a head-mounted device and a peripheral device according to an embodiment of the present disclosure.

In order to explain the method and apparatus for time synchronization between the head-mounted device and the peripheral device according to the present disclosure, FIG. 1 illustrates a method for time synchronization between a head-mounted device and a peripheral device according to an embodiment of the present disclosure, and FIG. 2 illustrates an apparatus for time synchronization between a head-mounted device and a peripheral device according to an embodiment of the present disclosure.

The following descriptions for the exemplary embodiments are only illustrative and shall not be used as any limitations on the present disclosure and the application or usage thereof. The technologies and devices known by the ordinary skill in the art may not be discussed in detail, however, in a proper case, the technologies and devices should be regarded as a part of the description.

As illustrated in FIG. 1, the method for time synchronization between the head-mounted device and the peripheral device according to the embodiment of the present disclosure includes the following actions in blocks.

S1: Sample data of an inertial measurement unit of the peripheral device is obtained, and a first timestamp representing a time at which the sample data is sampled is determined.

For example, the peripheral device may be a handheld peripheral device such as an intelligent terminal, an intelligent glove, and a handle. For example, the inertial measurement unit of the handle may perform sampling to obtain the sample data and record the first timestamp representing a time at which the sample data is sampled. The peripheral device may establish a wired or wireless communication connection with the head-mounted device.

S2: An interrupt request and the sample data are transmitted to the head-mounted device, and a second timestamp representing a time at which the interrupt request is transmitted is determined.

For example, the inertial measurement unit may transmit the sample data and the first timestamp to a single-chip microcomputer of the handle. The single-chip microcomputer carrying the sample data transmits an interrupt request to a master chip of the head-mounted device and records the second timestamp representing the time at which the interrupt request is transmitted;

S3: A third timestamp representing a time at which the interrupt request is received by the head-mounted device is determined.

S4: A time difference is determined based on the third timestamp and the second timestamp, and time compensation is performed on the first timestamp based on the time difference to enable the peripheral device and the head-mounted device to complete the time synchronization with a unified time standard.

As illustrated in FIG. 1, in block S1, the sample data of the inertial measurement unit of the peripheral device is obtained, and the first timestamp representing a time at which the sample data is sampled is determined. In the present embodiment, a sampling frequency of the inertial measurement unit may be 1 KHz. The inertial measurement unit of the peripheral device obtains the sample data at a sampling rate of 1 KHz, and thus the sampling accuracy and timeliness of the sample data can be guaranteed. Further, in the present embodiment, the sample data includes angular speed data and gravitational acceleration data of the peripheral device. The angular speed data is data of a gyroscope (Gyro), and the gravitational acceleration data is data of a gravity sensor (Acc).

In the embodiment illustrated in FIG. 1, in block S2, the interrupt request and the sample data are transmitted to the head-mounted device, and the second timestamp representing the time at which the interrupt request is transmitted is determined. In this process, the inertial measurement unit may transmit the sample data and the first timestamp to the single-chip microcomputer of the handle via a Bluetooth device and record the second timestamp at a transmitting time. Thus, it is convenient to calculate a time difference between the receiving time of the head-mounted device side and the transmitting time of the handle side.

In the embodiment illustrated in FIG. 1, in block S3, said determining the third timestamp representing the time at which the interrupt request is received by the head-mounted device includes the following actions in blocks.

S31: A reading time at which the sample data is read is obtained as recorded by the head-mounted device. The reading time at which the sample data is read is a time at which the sample data is read by the head-mounted device via a communication interface after the head-mounted device receives the interrupt request and obtains the sample data S32: A timestamp corresponding to the reading time at which the sample data is read as recorded by the head-mounted device, is determined as the third timestamp.

The head-mounted device, after receiving the interrupt request and obtaining the sample data, reads the sample data via the communication interface, for example, a Serial Peripheral Interface (SPI). The head-mounted device records, according to a time standard thereof, the reading time at which the sample data is read.

By obtaining the reading time at which the sample data is read as recorded by the head-mounted device and by determining the timestamp corresponding to the reading time as the third timestamp, the peripheral device obtains a time when the head-mounted device side receives and reads the data, for further calculating the time difference between the receiving time of the head-mounted device side and the transmitting time of the handle side.

In the embodiment illustrated in FIG. 1, in block S4, the time difference is determined based on the third timestamp and the second timestamp, and the time compensation is performed on the first timestamp based on the time difference, so that the peripheral device and the head-mounted device can complete the time synchronization with the unified time standard. In the present embodiment, the process of determining the time difference based on the third timestamp and the second timestamp includes: calculating a first difference between the third timestamp and the second timestamp; calculating a second difference between the first difference and a transmission consumption time obtained in advance; and determining the second difference as the time difference.

For example, the time difference is obtained by subtracting the second timestamp and then subtracting the transmission consumption time obtained in advance from the third timestamp, that is, $\Delta t = T3 - T2 -$ transmission consumption time, where $\Delta t$ is the time difference, T3 is the third timestamp, the T2 is the second timestamp. In this way, a time difference between a time when the master chip of the head-mounted device on the head-mounted device side receives data and a time when the single-chip microcomputer of the peripheral device side receives data is calculated. Then, the time compensation is performed on the inertial measurement unit of the peripheral device based on the time difference. In the present embodiment, the inertial measurement unit (IMU) of the head-mounted device and the master chip of the head-mounted device are the same in time standard, and the master chip of the head-mounted device and an operating system of a VR system are the same in time standard. Therefore, the master chip of the head-mounted device, the operating system of the VR system, and the inertial measurement unit of the head-mounted device have the same time standard, which is obtained after time compensation is performed on the inertial measurement unit of the peripheral device based the time difference. In this way, the inertial measurement unit of the head-mounted device and the inertial measurement unit of the peripheral device are synchronized, thereby improving users' immersive experience.

As mentioned above, in the method for time synchronization between the head-mounted device and the peripheral device according to the present disclosure, the sample data of the inertial measurement unit of the peripheral device is obtained, and the first timestamp representing the time at which the sample data is sampled is determined; the third timestamp representing the time at which the interrupt request is received by the head-mounted device is determined; and the time difference is determined based on the third timestamp and the second timestamp, and the time compensation is performed on the first timestamp based on the time difference, thereby allowing the peripheral device and the head-mounted device to complete the time synchronization with the unified time standard.

As illustrated in FIG. 2, the present disclosure further provides a time synchronization apparatus 100 for a head-mounted device and a peripheral device to implement the above-mentioned method for time synchronization between the head-mounted device and the peripheral device. The time synchronization apparatus 100 includes a processing unit 101, a transmission interrupt unit 102, a determination unit 103, and a difference compensation unit 104.

The processing unit 101 is configured to obtain sample data of an inertial measurement unit of the peripheral device, and determine a first timestamp representing a time at which the sample data is sampled.

The transmission interrupt unit 102 is configured to transmit an interrupt request and the sample data to the head-mounted device, and determine a second timestamp representing a time at which the interrupt request is transmitted.

The determination unit 103 is configured to determine a third timestamp representing a time at which the interrupt request is received by the head-mounted device.

The difference compensation unit 104 is configured to determine a time difference based on the third timestamp and the second timestamp, and perform time compensation for the first timestamp based on the time difference to enable the peripheral device and the head-mounted device to complete the time synchronization with a unified time standard.

In the present embodiment, a sampling frequency of the inertial measurement unit is 1 KHz, and the sample data includes angular speed data and gravitational acceleration data of the peripheral device. The inertial measurement unit of the peripheral device may include a gyroscope and a gravity sensor. The gyroscope is configured to sense the angular speed data of the peripheral device. The gravity sensor is configured to sense the gravitational acceleration data of the peripheral device.

In the present embodiment, the determination unit 103 may be configured to: obtain a reading time at which the sample data is read as recorded by the head-mounted device, the reading time at which the sample data is read being a time at which the sample data is read by the head-mounted device via a communication interface after the head-mounted device receives the interrupt request and obtains the sample data; and determine, as the third timestamp, a timestamp corresponding to the reading time at which the sample data is read as recorded by the head-mounted device.

In the embodiment illustrated in FIG. 2, the difference compensation unit 104 is configured to: calculate a first difference between the third timestamp and the second timestamp; calculate a second difference between the first difference and a transmission consumption time obtained in advance; and determine the second difference as the time difference. The time difference is obtained by subtracting the second timestamp and then subtracting the transmission consumption time obtained in advance from the third timestamp. The difference compensation unit 104 then performs the time compensation for the first timestamp based on the time difference, thereby allowing the inertial measurement unit of the peripheral device and the head-mounted device to complete the time synchronization with the unified time standard.

In view of the above-mentioned implementations, according to the time synchronization apparatus 100 for the head-mounted device and the peripheral device in the present disclosure, the processing unit 101 obtains the sample data of the inertial measurement unit of the peripheral device and determines the first timestamp representing a time at which the sample data is sampled; the transmission interrupt unit 102 transmits the interrupt request and the sample data to the head-mounted device and determines the second timestamp representing the time at which the interrupt request is transmitted; the determination unit 103 determines the third timestamp representing the time at which the interrupt request is received by the head-mounted device; and the difference compensation unit 104 determines the time difference based on the third timestamp and the second timestamp and performs the time compensation for the first timestamp based on the time difference. In this way, the peripheral device and the head-mounted device can complete the time synchronization with the unified time standard.

The method and apparatus for time synchronization between the head-mounted device and the peripheral device provided according to the present disclosure are described as above with reference to the accompanying drawings by ways of examples. However, those skilled in the art can understand that various improvements may be made to the above-mentioned method and apparatus for time synchronization between the head-mounted device and the peripheral device provided according to the present disclosure without departing from the contents of the present disclosure. The protection scope of the present disclosure should be determined by the contents of the appended claims.

What is claimed is:

1. A method for time synchronization between a head-mounted device and a peripheral device, performed by the peripheral device, and comprising:
   obtaining sample data of an inertial measurement unit of the peripheral device, and determining a first timestamp representing a time at which the sample data is sampled;
   transmitting an interrupt request and the sample data to the head-mounted device, and determining a second timestamp representing a time at which the interrupt request is transmitted;
   determining, by obtaining a reading time at which the sample data is read as recorded by the head-mounted device, a third timestamp representing a time at which the interrupt request is received by the head-mounted device; and
   determining a time difference based on the third timestamp and the second timestamp, and performing time compensation on the first timestamp based on the time difference to enable the peripheral device and the head-mounted device to complete the time synchronization with a unified time standard,
   wherein said determining the time difference based on the third timestamp and the second timestamp comprises:
   calculating a first difference between the third timestamp and the second timestamp: and
   calculating a second difference between the first difference and a transmission consumption time obtained, by the peripheral device, in advance, and determining the second difference as the time difference.

2. The method for time synchronization between the head-mounted device and the peripheral device of claim 1, wherein a sampling frequency of the inertial measurement unit is 1 KHz.

3. The method for time synchronization between the head-mounted device and the peripheral device of claim 2, wherein the sample data comprises angular speed data and gravitational acceleration data of the peripheral device.

4. The method for time synchronization between the head-mounted device and the peripheral device of claim 3, wherein the inertial measurement unit of the peripheral device comprises a gyroscope configured to sense the angular speed data of the peripheral device, and a gravity sensor configured to sense the gravitational acceleration data of the peripheral device.

5. The method for time synchronization between the head-mounted device and the peripheral device of claim 1, wherein said obtaining the sample data of the inertial measurement unit of the peripheral device, and said determining the first timestamp representing the time at which the sample data is sampled comprise:
  obtaining, from the inertial measurement unit via a Bluetooth device, the sample data and sampling time of the sample data as recorded by the inertial measurement unit; and determining, as the first timestamp, a timestamp corresponding to the sampling time of the sample data.

6. The method for time synchronization between the head-mounted device and the peripheral device of claim 1, wherein said determining the third timestamp representing a time at which the interrupt request is received by the head-mounted device comprises:
  said obtaining the reading time at which the sample data is read as recorded by the head-mounted device, the reading time being a time at which the sample data is read by the head-mounted device via a communication interface after the head-mounted device receives the interrupt request and obtains the sample data; and
  determining, as the third timestamp, a timestamp corresponding to the reading time.

7. An apparatus of a peripheral device for time synchronization between a head mounted device and the peripheral device, the apparatus comprising:
  a processing unit configured to obtain sample data of an Inertial measurement unit of the peripheral device, and determine a first timestamp representing a time at which the sample data is sampled:
  a transmission interrupt unit configured to transmit an interrupt request and the sample data to the head-mounted device, and determine a second timestamp representing a time at which the interrupt request is transmitted:
  a determination unit configured to determine, by obtaining a reading time at which the sample data is read as recorded by the head-mounted device, a third timestamp representing a time at which the interrupt request is received by the head-mounted device: and
  a difference compensation unit configured to determine a time difference based on the third timestamp and the second timestamp, and perform time compensation on for the first timestamp based on the time difference to enable the peripheral device and the head-mounted device to complete the time synchronization with a untiled time standard,
  wherein the difference compensation unit is configured to calculate a first difference between the third timestamp and the second timestamp; and
  calculate a second difference between the first difference and a transmission consumption time obtained, by the apparatus, in advance, and determine the second difference as the time difference.

8. The apparatus for time synchronization between the head-mounted device and the peripheral device of claim 7, wherein the sample data comprises angular speed data and gravitational acceleration data of a handle of the peripheral device.

9. The apparatus for time synchronization between the head-mounted device and the peripheral device of claim 7, wherein the determining comprises: obtaining a reading time at which the sample data is read as recorded by the head-mounted device, the reading time being a time at which the sample data is read by the head-mounted device via a communication interface after the head-mounted device receives the interrupt request and obtains the sample data; and
  determining, as the third timestamp, a timestamp corresponding to the reading time.

\* \* \* \* \*